United States Patent [19]

Aspinwall

[11] 3,937,013
[45] Feb. 10, 1976

[54] BY-PASS JET ENGINE WITH CENTRIFUGAL FLOW COMPRESSOR

[75] Inventor: Robert H. Aspinwall, Zionsville, Ind.

[73] Assignee: General Motors Corporation, Detroit, Mich.

[22] Filed: June 27, 1974

[21] Appl. No.: 483,878

[52] U.S. Cl. ............... 60/226 R; 60/39.36; 415/83; 415/145
[51] Int. Cl.² .......................................... F02K 3/06
[58] Field of Search ................ 60/262, 226, 39.36; 415/143, 144, 83, 145

[56] References Cited
UNITED STATES PATENTS

| | | | |
|---|---|---|---|
| 2,575,682 | 11/1951 | Price | 60/262 |
| 2,827,261 | 3/1958 | Parker et al. | 415/144 |
| 3,116,908 | 1/1964 | Wosika | 60/39.36 |
| 3,449,914 | 6/1969 | Brown | 60/226 R |
| 3,623,318 | 11/1971 | Shank | 60/39.36 |
| 3,703,081 | 11/1972 | Krebs et al. | 60/226 R |
| 3,781,126 | 12/1973 | Benisek | 415/143 |
| 3,814,549 | 6/1974 | Cronstedt | 415/143 |

*Primary Examiner*—Carlton R. Croyle
*Assistant Examiner*—Robert E. Garrett
*Attorney, Agent, or Firm*—Paul Fitzpatrick

[57] ABSTRACT

A simple by-pass type jet propulsion engine includes a centrifugal compressor and a centripetal turbine mounted back-to-back and a combustion apparatus disposed radially outwardly of the turbine. These constitute the core engine; the fan part of the engine is provided by fan blades extending outwardly from the rotor blades of the core engine compressor which discharge through outlet guide vanes into a fan duct lying radially outwardly of the combustion apparatus. The fan outlet guide vanes or the fan duct nozzle may be variable to substantially close the fan duct for starting the engine. Part of the air flows from the compressor to the combustion apparatus of the core engine through hollow turbine nozzle vanes.

5 Claims, 2 Drawing Figures

BY-PASS JET ENGINE WITH CENTRIFUGAL FLOW COMPRESSOR

My invention is directed to a simple fan type gas turbine jet propulsion engine. An engine according to my invention is particularly suitable because of its simplicity, low cost, and light weight for use as a small jet engine in remote controlled expendable aircraft such as target drones. However, the principles of the invention may also be applied to longer life engines for light aircraft.

Briefly stated, an engine according to the preferred embodiment of my invention includes a centrifugal compressor and a centripetal turbine mounted back-to-back with the compressor discharging through combustion apparatus disposed radially outwardly of the turbine to constitute a core engine. The rotor may be supported at the forward end of the compressor and outlet end of the turbine. The core engine discharges through a jet propulsion nozzle. The fan portion of the engine is constituted by fan blades extending from the centrifugal compressor rotor and discharging through a duct which extends outwardly and then rearwardly over the outer wall of the combustion apparatus. In most cases, it is preferable to have means for substantially closing the fan duct to facilitate starting the engine. This may be taken care of by variable setting outlet guide vanes of the fan or by a closable jet nozzle at the discharge end of the fan duct. The turbine nozzle is cooled and flow of air to the combustion apparatus is facilitated by directing part of this air spanwise through hollow turbine nozzle vanes.

The principal object of my invention is to provide a very simple inexpensive small fan jet engine of adequate performance and fuel economy.

The nature of the invention and its advantages will be apparent to those skilled in the art from the accompanying detailed description of the preferred embodiment of the invention, the accompanying drawings, and the appended claims.

Figure 1:
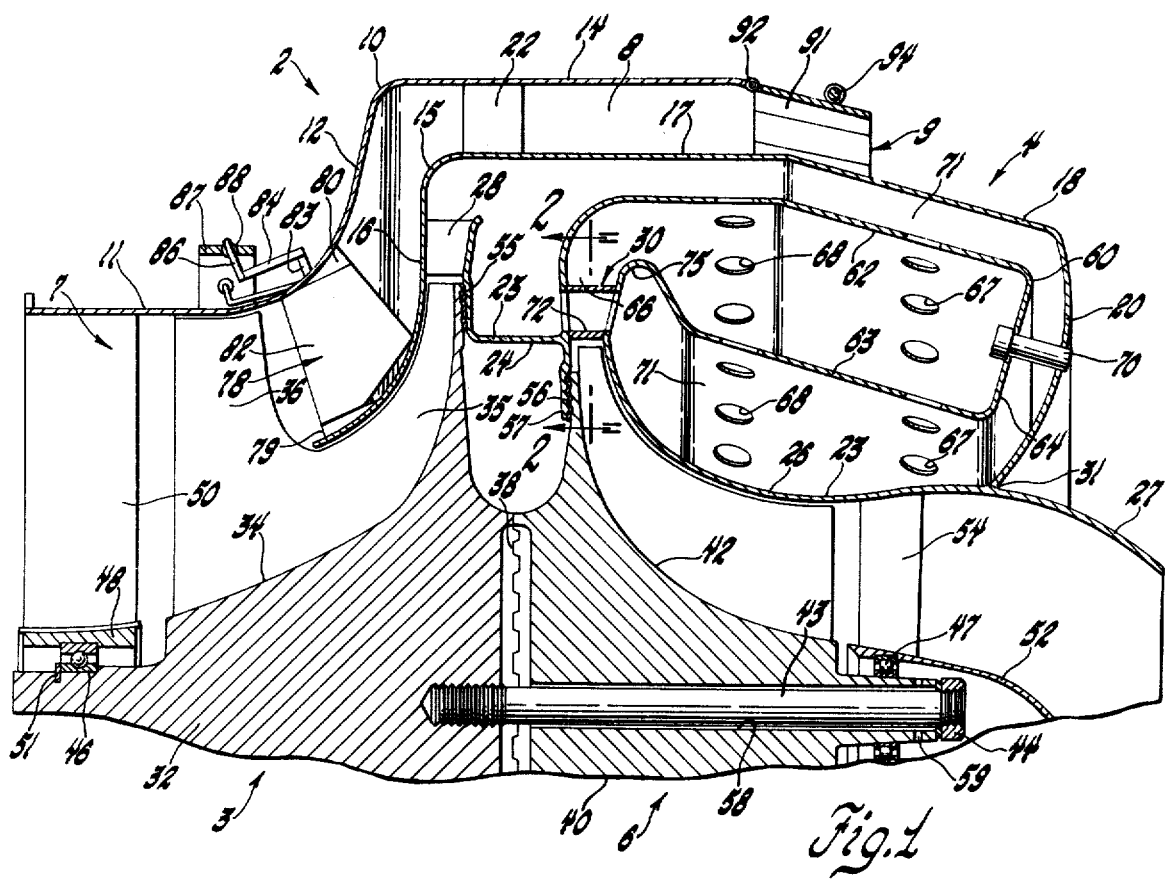
FIG. 1 is a sectional view of a fan jet engine taken in a plane containing the axis of rotation of the rotor of the engine.

Referring first to FIG. 1, this discloses a simple fan jet engine particularly suited for propulsion of aircraft. The engine 2 includes a compressor 3, combustion apparatus 4, and a turbine 6. These are the basic elements of a core engine which provides jet thrust and also provides power to drive a fan 7 which discharges air under pressure through a fan duct 8 to a propulsion nozzle 9.

The engine is of generally circular cross-section. It includes an outer casing 10 of circular cross-section which comprises a generally cylindrical forward portion 11, a flaring wall portion 12, and a fan duct outer wall 14. The fixed structure also includes an intermediate casing 15 which has a generally radial forward portion 16, a cylindrical portion 17, and a converging portion 18, the latter two defining the inner wall of the fan duct 8 and also the outer casing of combustion apparatus 4. Forward portion 16 is the outer shroud of the compressor and separates compressor from fan flow. The intermediate casing terminates in an inwardly extending annular disk 20 which defines the rear end wall of the combustion apparatus. The outer casing 10 and intermediate casing 15 may be connected structurally by circumferentially spaced struts 22 which may be welded to the intermediate casing and welded or bolted to the outer casing.

The fixed structure also includes an inner casing 23 which comprises a forward portion 24 extending from the compressor rotor to the turbine rotor, to be described, an intermediate converging portion 26 which defines the inner wall of the combustion apparatus and the outer shroud of the turbine, and a converging jet nozzle portion 27 downstream of the turbine. Casing portion 23 is connected to portion 16 of intermediate casing 15 by a ring of compressor diffuser vanes 28. The vanes may be welded to the wall portions. The portion 26 of the inner casing is connected to portion 24 through an annular turbine nozzle 30. The intermediate wall is connected to the inner wall at annular joining line 31. These parts may be welded or bolted together at these junctions.

All of the casing portions are divided on axially extending split lines which may be diametrically opposite in a plane which contains the axis of rotation of the rotor of the engine. Such a split of the casings or some other expedient is required to fit the casings around the rotor.

Considering now the rotating portion of the engine, the compressor-fan rotor 32 includes an annular hub 34 which may be similar to those of conventional centrifugal compressors. Centrifugal compressor blades 35 extend outwardly and forwardly from the hub and fan blades 36 extend outwardly from the forward portion of the compressor blades. The compressor and fan blades blend smoothly into each other without any discontinuity of curvature. Thus there is no discontinuity of pressure at the leading edge of casing portion 16 to cause recirculation between the compressor and the fan. The rear face of hub 34 is formed with radial splines 38 coupled to the turbine rotor 40. This rotor includes a hub 42 from which turbine blades extend rearwardly and outwardly to provide an inward-flow turbine of known type. The forward face of hub 42 is splined to couple to the splines 38 of the compressor rotor. These may be held together by a tie bolt 43 threaded into the compressor rotor and a nut 44 threaded onto the tie bolt and bearing against the rear end of the turbine rotor. These parts thus constitute a unitary compact rotor assembly.

The rotor assembly is mounted for rotation on a forward thrust bearing 46 and a rear radial bearing 47. Bearing 46 is suitably mounted in a bearing support ring 48 fixed through radial struts 50 to the forward end of outer casing 10. The inner race of bearing 46 may abut a shoulder on the forward end of the hub and be held in place by a snap ring 51 or other fastener. The rear bearing 47 is suitably mounted in a housing 52 at the center of the jet nozzle 27, which is supported from the intermediate wall by a ring of struts 54.

The air inlet to both the core engine and the fan is provided by the forward end portion 11 of the outer casing and the bearing support ring 48. The struts 50 which connect these may have setting or twist if it is desired to impart swirl to the air entering the rotor 32.

A labyrinth seal is defined at 55 between the compressor rotor and the inner casing by ridges on the rear face of the hub 34 or the forward face of the casing, or both. Similarly, a labyrinth seal 56 is defined between the turbine rotor hub 42 and a flange 57 extending inwardly from the inner casing. These seals are provided to substantially inhibit flow of air directly from the compressor rotor to the turbine rotor. A part of the leakage through seal 55 may flow through tooth clearances in the splines 38, through a passage 58 in the turbine rotor around tie bolt 43, and through an outlet or outlets 59 in the rear end of the turbine hub to provide some cooling for bearing 47.

No seals or lubricating means are illustrated for the rolling contact bearings 46 and 47. These may be prelubricated for short duration flights; or, if required, conventional lubrication means and seals for lubricants can be provided according to known practice.

Proceeding now to the combustion apparatus 4, this includes an annular combustion liner 60 having an outer wall 62, an inner wall 63, and an upstream wall 64 joining the other two walls. The downstream and forward ends of the liner walls are curved inwardly to an outlet 66 discharging into the turbine nozzle 30. The combustion liner may be of conventional type. As illustrated, it defines ports 67 for primary combustion air and ports 68 for dilution air according to known practice. Fuel is supplied to the combustion apparatus by a ring of fuel spray nozzles 70 extending through the casing portion 20 and the upstream wall of the combustion liner. The combustion liner may be slidably mounted on the exterior of the turbine nozzle 30 and secured there by any suitable means.

Air discharged by the compressor 28 flows into a plenum 71 around the liner 60 defined by the casing portions 17, 18, 20, and 23, through two paths. One path is exteriorly of the combustion liner and the other is through hollow vanes of the turbine nozzle 30. Air may also flow from the outer part of the plenum around the upstream end of the combustion liner to the inner portion of the plenum 71.

Figure 2:
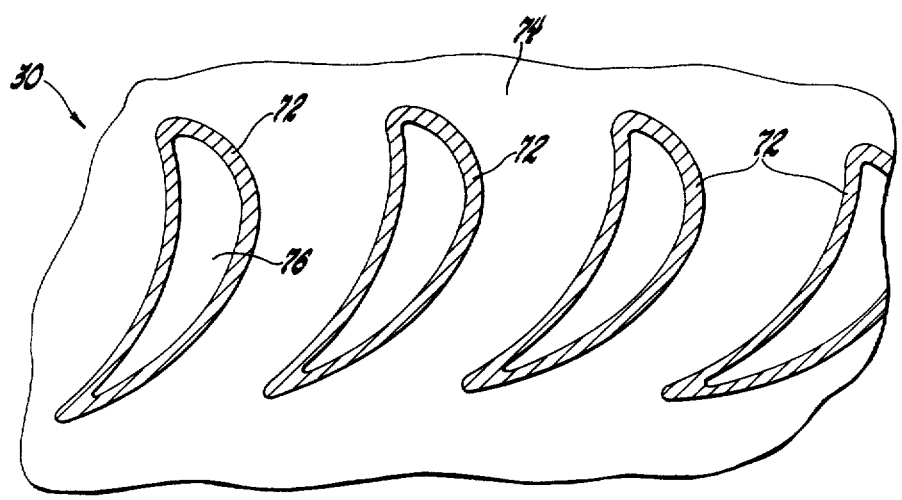
FIG. 2 is a partial sectional view through the turbine nozzle, taken on the plane indicated by the line 2—2 in FIG. 1.

Referring also to FIG. 2, the turbine nozzle includes an annular cascade of nozzle vanes 72 which may be cast or formed sheet metal structures welded to a forward ring or shroud 74 and a rear ring or shroud 75. Each vane defines a spanwise extending passage 76 and the shrouds 74 and 75 have openings matching the passages through the vanes. Substantial area for flow of combustion air to the inner wall of the combustion liner is thus provided. This flow of air also is advantageous in that it provides substantial cooling for the turbine nozzle vanes which are exposed to hot combustion products flowing over the outer surfaces of the vanes.

Turning now to the fan portion of the engine, we may restate that air entering between struts 50 and flowing through the outer or fan portion 36 of the compressor rotor blades is discharged through fan duct 8. The air flow from the fan blades 36 is diffused and straightened in a ring of fan outlet guide vanes 78. These vanes may be fixed. It may be desirable to have them mounted for variable setting; that is, for rotation about a spanwise extending axis of each blade so that the area for flow from the fan blades can be substantially closed. Such variable setting vane cascades are well known and, therefore, details need not be enlarged upon. See, for example, U.S. Pat. Nos. to Campbell 2,857,092, Oct. 21, 1958; Gardiner 2,862,654, Dec. 2, 1958; Johnson 3,303,992, Feb. 14, 1967, and Mason 3,542,484, Nov. 24, 1970. As illustrated, the variable vanes include an inner end portion 79 brazed or otherwise fixed to the forward surface of casing portion 16, an outer end portion 80 brazed or otherwise fixed to the casing portion 12, and a main vane portion 82 bridging the gap between the end portions. Vane portion 82 is fixed to a shaft 83 rotatably mounted in the casing portion 12 on the vane end portions 79 and 80. A crank arm 84 fixed to each shaft 83 includes a crankpin 86 coupled to an actuating ring 87 extending around the outer casing. The connection between the crankpin and actuating ring may include a ball joint 88 which may swivel in the ring 87 and which may slide on crankpin 86. The actuating ring 87 may be rotated around the axis of the engine by any suitable actuator, as is well understood.

The fan duct 8 may terminate in a fixed nozzle, particularly if the fan outlet vanes 78 are capable of closing. However, the fan duct may be closed off by a variable area outlet nozzle as illustrated at 9. Such nozzles are well known. As illustrated, the nozzle 9 comprises a ring of overlapping flaps or plates 91 which may swing about hinge axes at 92 tangent to the casing. The flaps 91 may be pulled inwardly against gas pressure by any suitable actuating means indicated schematically by a cable 94 which may be tightened to close the nozzle. Typical multiflap nozzle structures are illustrated in U.S. Pat. Nos. to Gaubatz 2,697,907, Dec. 28, 1954, to Gardiner et al 2,828,602, Apr. 1, 1958, and to Johnson 3,592,389, July 13, 1971. If a variable nozzle is used to close off the fan duct to reduce the starting load, the variable fan outlet guide vanes may be dispensed with. As a matter of fact, if sufficient power is made available for starting the engine, all variable geometry of the fan system may be omitted.

The engine may be started by a motor connected to the forward end of hub 32, by an impingement starting system in which air is directed tangentially against the compressor or turbine blades, or by windmilling if a sufficiently powerful jet, as from another jet engine, is available for discharge into the inlet of the engine.

It may be pointed out that the configuration described is suited to fan jet engines having a by-pass ratio of about 2 and in which the fan and compressor compression ratios are 2 and 7, respectively, or to engines in which the by-pass ratio is approximately 2, the fan pressure ratio 1.5, and the compressor pressure ratio about 5, for example. An engine with a thrust of about 400 lbs. should weigh less than 50 lbs. and can be slightly over a foot in diameter.

It will be apparent from the foregoing that the principles of my invention provide for a very simple, economical, and light weight fan jet engine having a high thrust to weight ratio well suited to expendable engines or to more durable engines for operation of small aircraft.

The detailed description of the preferred embodiment of the invention for the purpose of explaining the principles thereof is not to be considered as limiting or restricting the invention, since many modifications may be made by the exercise of skill in the art.

I claim:

1. A by-pass type single-shaft gas turbine jet propulsion engine comprising, in combination, an engine casing; a centrifugal compressor rotor and a centripetal turbine rotor rigidly connected coaxially back-to-back; bearing means for the rotor supported by the engine casing at the front end of the rotor and at the rear end of the rotor; combustion apparatus including combustion liner means disposed radially outward of the turbine; a diffuser connecting the compressor rotor to the combustion apparatus; and a turbine nozzle providing an outlet from the combustion liner means into the turbine rotor; the engine including an annular cascade of fan blades extending radially from the upstream end of the compressor rotor and an annular fan duct terminating in a jet nozzle disposed around the combustion apparatus, the fan blades discharging only through the fan duct; and means operable to throttle only the fan duct for starting the engine.

2. An engine as defined in claim 1 in which the means operable to throttle the fan duct is a variable cascade of outlet guide vanes for the fan.

3. An engine as defined in claim 1 in which the means operable to throttle the fan duct is a variable nozzle at the outlet of the fan duct.

4. A by-pass type single-shaft gas turbine jet propulsion engine comprising, in combination, an outer casing defining the outer wall of an engine air inlet and a by-pass duct; an intermediate casing defining the inner wall of the by-pass duct and the outer wall of a core engine; an inner casing defining the inner wall of combustion apparatus of the engine and the outer wall of the turbine and exhaust nozzle of the core engine; the core engine comprising a centrifugal compressor rotor and a centripetal turbine rotor rigidly connected coaxially back-to-back; bearing means for the rotor supported by the outer casing at the front end of the rotor and by the inner casing at the rear end of the rotor; combustion apparatus including combustion liner means disposed radially outward of the turbine between the intermediate and inner casings; a diffuser connecting the compressor rotor to the combustion apparatus; and a turbine nozzle providing an outlet from the combustion liner means into the turbine rotor; the engine including an annular cascade of fan blades extending radially from the upstream end of the compressor rotor and an annular fan duct between the outer and intermediate casings terminating in a jet nozzle disposed around the combustion apparatus, the fan blades discharging only through the fan duct.

5. A by-pass type single shaft gas turbine jet propulsion engine comprising, in combination, an outer casing defining the outer wall of an engine air inlet and a by-pass duct; an intermediate casing defining the inner wall of the by-pass duct and the outer wall of a core engine; an inner casing defining the inner wall of combustion apparatus of the engine and the outer wall of the turbine and exhaust nozzle of the core engine, the core engine comprising a centrifugal compressor rotor and a centripetal turbine rotor rigidly connected coaxially back-to-back; bearing means for the rotor supported by the outer casing at the front end of the rotor and by the inner casing at the rear end of the rotor; combustion apparatus including combustion liner means disposed radially outward of the turbine between the intermediate and inner casings; a diffuser connecting the compressor rotor to the combustion apparatus; and a turbine nozzle providing an outlet from the combustion liner means into the turbine rotor, the engine including an annular cascade of fan blades extending radially from the upstream end of the compressor rotor and an annular fan duct between the outer and intermediate casings terminating in a jet nozzle disposed around the combustion apparatus, the fan blades discharging only through the fan duct, the fan duct extending generally radially from the fan and then rearwardly; and means operable to only throttle the fan duct for starting the engine.

* * * * *